Aug. 12, 1930.　　　C. F. VAN DER SPEK　　　1,772,503
TRANSMISSION
Filed April 30, 1930　　3 Sheets-Sheet 1

Inventor
Cornelis Franciscus Van der Spek
By Frederick C. Bromley
Attorney

Aug. 12, 1930.  C. F. VAN DER SPEK  1,772,503

TRANSMISSION

Filed April 30, 1930   3 Sheets-Sheet 2

Inventor
Cornelis Franciscus Van der Spek
By Frederick E. Bromley
Attorney

Aug. 12, 1930.                C. F. VAN DER SPEK                1,772,503
                                  TRANSMISSION
                          Filed April 30, 1930    3 Sheets-Sheet 3
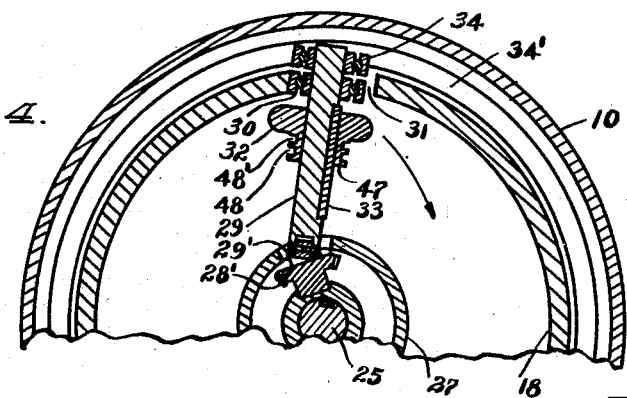
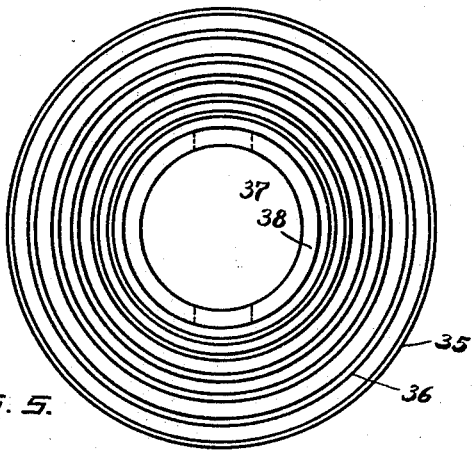
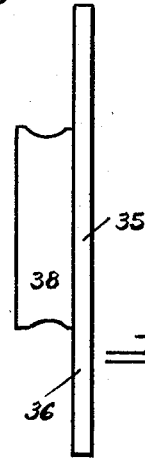
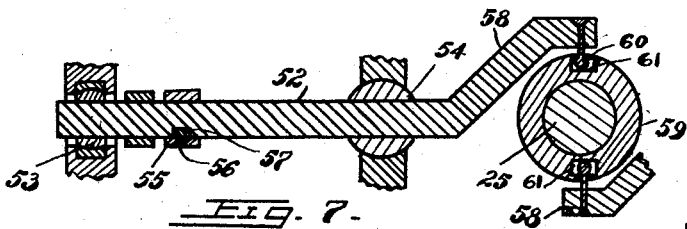
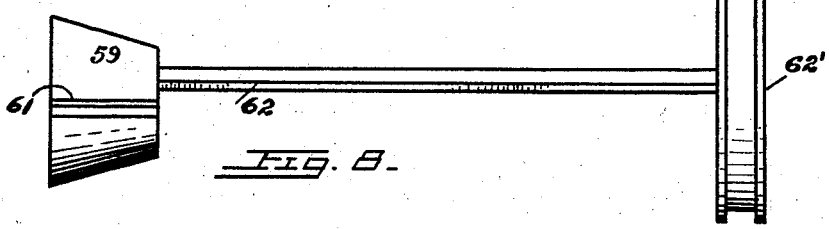
Inventor
Cornelis Franciscus Van der Spek
By Frederick E. Bromley
   Attorney.

Patented Aug. 12, 1930

1,772,503

UNITED STATES PATENT OFFICE

CORNELIS FRANCISCUS VAN DER SPEK, OF TORONTO, ONTARIO, CANADA

TRANSMISSION

Application filed April 30, 1930, Serial No. 448,677, and in Canada January 2, 1930.

The invention relates to improvements in transmissions as described in the present specification and shown in the accompanying drawings which form part of the same.

The invention has for its object the provision of a variable speed transmission particularly designed for automobile engines although it also applies to other prime movers.

The invention consists essentially in the novel construction and arrangement of parts whereby friction wheels are employed to obtain a variable reverse speed as well as the usual variable forward speed. A very salient feature resides in the manner of locking the friction wheels to obtain direct forward speed.

Referring to the drawings, Figure 1 is a sectional elevation of the invention.

Figure 4 is a somewhat similar but fragmentary section depicting one of the friction wheels in an angular position for automatically returning to low speed.

Figure 5 is a view of the toothed face of a friction disc.

Figure 6 is an edge view thereof.

Figure 7 is a section of a shifting mechanism.

Figure 8 is a detail of an attached cone and collar thereof.

Like numerals of reference indicate corresponding parts in each of the figures throughout the drawings.

Figure 1:
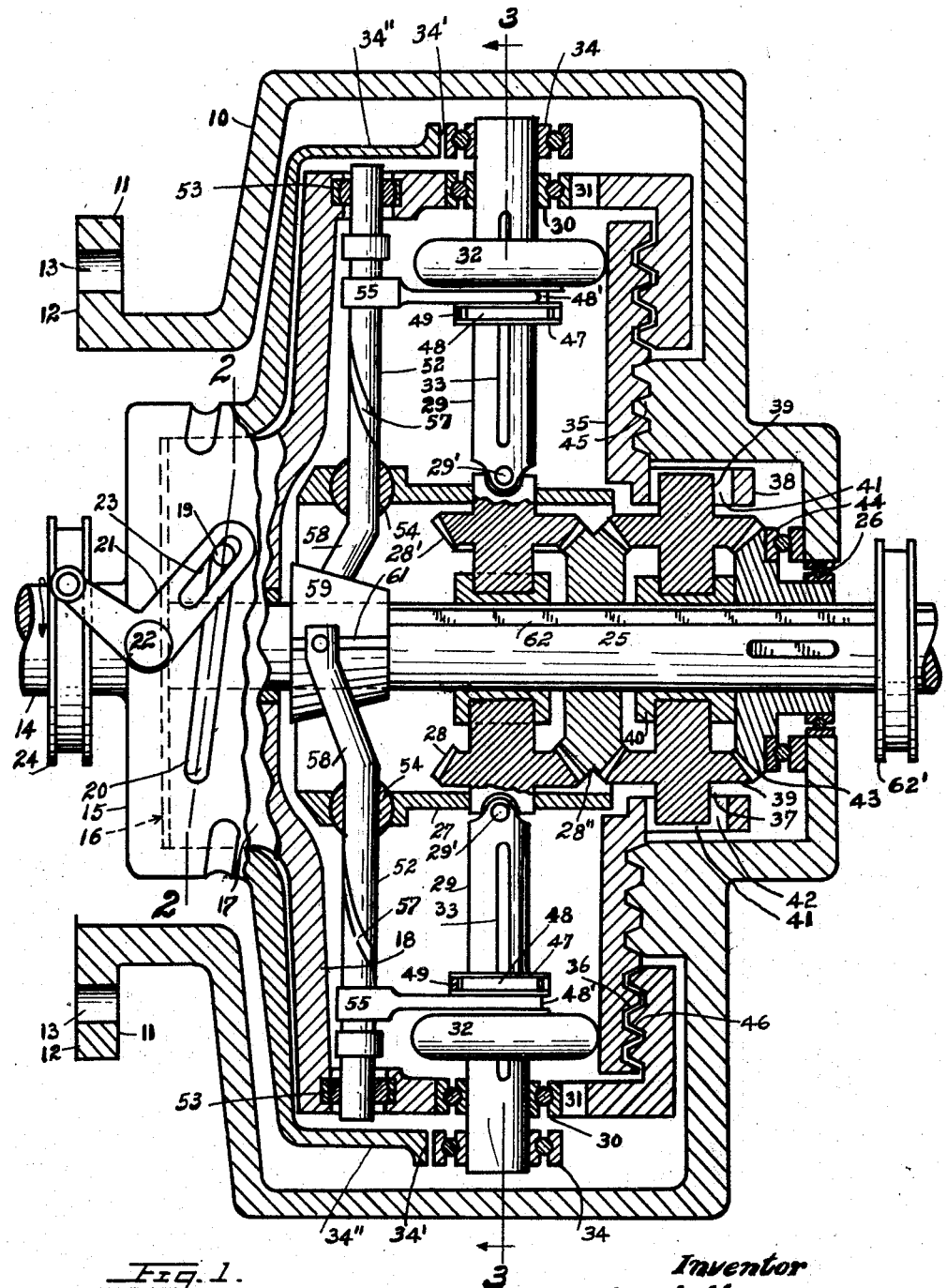

In the drawings, the reference numeral 10 generally denotes the case which is constructed and arranged to contain the various mechanism. It has a flange 11 by which it may be, as usual, secured to the flywheel housing of an internal combustion engine. The face 12 of the flange abuts the flywheel housing, and bolts fit into the holes 13 for attachment purposes.

Figure 2:
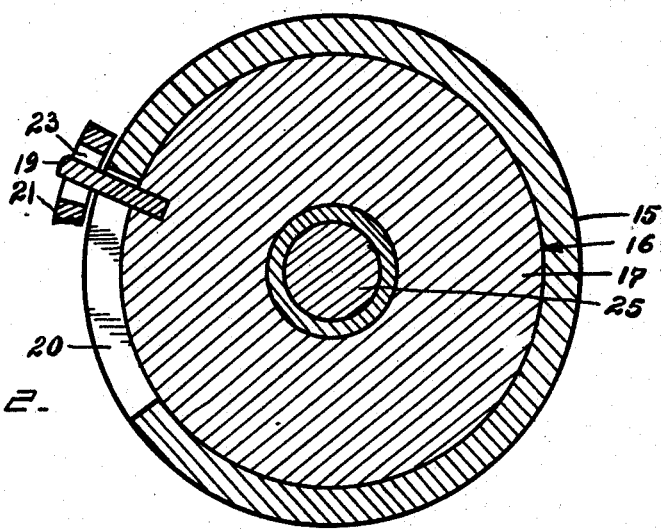
Figure 2 is a section taken on the line 2—2 of Figure 1.

14 is a stub shaft for taking off powder from the prime mover and may be directly bolted, as customary, to the flywheel. The inner end of the shaft is enlarged as at 15 and recessed at 16 to receive the annular boss 17 of the housing 18. This housing is made in two or more parts to take the mechanism shown therein. Radially projecting from said boss in spaced relation are pins as at 19, each of which is disposed in a slot as at 20, see Figures 1 and 2. The slots are formed in the enlarged end of the stub shaft in helical fashion as illustrated in Figure 1. By this construction, in the rotation of the shaft the pins are axially urged by the slots to normally produce a force shifting the housing 18 away from the shaft, the axial movement being limited by the length and angle of the slots.

21 is a shifter pivoted at 22 to the enlarged end 15 of the stub shaft 14 and slotted at 23 to receive one of the pins 19. While in the drawings only one shifter is shown, it is to be understood that in practice there will be as many as there are pins. 24 is a collar slidably mounted upon the shaft and engaged with the shifter. The collar is manually controlled by a conventional shift lever not shown since it may be of any well known construction. By movement of the collar in one direction the shifter throws the pin forwardly in the slot thus shifting the housing towards the stub shaft.

25 is a driven shaft journalled at one end in the boss 17 and at the other end in the casing 10 by means of the anti-friction bearing 26. 27 is a floating ring concentrically disposed with respect to the shaft 25 and containing the radially journalled bevel gears 28, 28', meshed with the double crown gear 28''. Normally, radially extending from each of the bevel gears 28, 28' is a shaft 29 attached through the medium of a universal joint 29'. The outer end of each of the radial shafts is journalled in the housing 18 by means of an anti-friction bearing 30 fitted in an opening 31 slightly laterally elongated so as to provide for freedom of movement.

Each of the shafts 29 has a friction wheel 32 slidably mounted on it and held against rotation by a key 33. Also mounted on these shafts, but exteriorly of the housing, are anti-friction bearings 34, the inner races of which are secured to the shafts while the outer races are disposed to engage the annular face 34' of the flange 34" when the housing 18 is shifted to the left. The flange is constructed integral with the enlarged end 15 of the shaft 14.

35 is a friction disc for engagement with the friction wheels and provided with a toothed face on which teeth 36 are concentrically arranged. The disc has a central opening 37 defined by a boss 38. Within the opening are radially disposed bevel gears 39 journalled in the boss 38 and in the member 40. The journal openings 41 of the boss are laterally elongated as at 42 to permit the disc to axially move. The bevel gears 39 are meshed with a like gear 43 keyed to the driven shaft 25 and laterally sustained by the thrust bearing 44. The stationary case 10 has teeth 45 for engagement with those of the disc as also has the housing 18 at 46.

Figure 3:
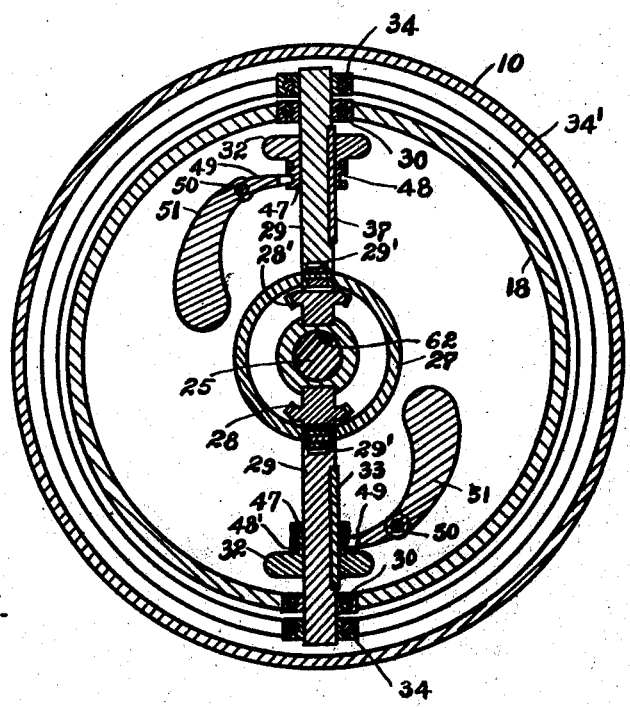
Figure 3 is a cross section taken on the line 3—3 of Figure 1.

Adverting to the friction discs, each is provided with a double integral collar 47 having grooves 48, 48'. The groove 48 is engaged by a yoke 49 pivoted at 50 and integral with a counterweight 51 so disposed as to urge the disc inwardly by centrifugal force, see Figure 3. By this expedient the discs are automatically returned to an inner position for producing low speed.

52 are radial rods journalled at their outer ends in swivel bearings 53 and in the vicinity of their inner ends in like bearings 54. Mounted on the rods are shifters 55 engaged with the grooves 48' of the collars 47 and provided with pins 56 fitted in helical channels 57 cut in the rods.

It will be manifest by this construction that upon turning the rods the shifters will be axially moved, which movement will be communicated to the friction discs.

The inner ends of the rods are offset as at 58 and engaged with a cone 59 slidably mounted on the driven shaft 25. The connection may be made in any suitable manner, such as by a ball-headed stud 60 lodged in a T-slot 61, see Figure 7.

Secured to the cone is a bar 62 slidably disposed in a flute in the shaft 25 and connected to the exterior shift collar 62'. The collar is manually controlled by a shift lever of any known type, not shown.

In the operation of the invention, as the stub shaft 14 is rotated the housing 18 turns therewith as a unit due to the pins 19. The driving torque acting against the inertia of the housing 18 induces the slots 20 to urge the housing away from the stub shaft so as to force the friction wheels 32 into engagement with the friction disc 35, which in turn is shifted so as to force its teeth 36 into engagement with those of the case 10. The disc is thus held stationary and the friction wheels turned by contact therewith.

The radial shafts 29 turn with the friction wheels and transmit their motion to the gears 28, 28', 28", 39 and 43. Since the gear 43 is keyed to the shaft 25, power is thus transmitted to the shaft from the prime mover.

To vary the speed of the shaft 25 the cone 59 is shifted by the collar 62'. The movement of the collar turns the rods 52, feeds the shifters 55 therealong and changes the positions of the friction wheels. Coincidentally with the turning of the rods they are bodily swung together with the radial shafts 29 in a plane at right angles to the axis of the shaft 25 by their offset ends 58 to facilitate the friction wheels being shifted radially of the disc; see Figure 4.

The friction wheels, disc and gearing are so proportioned that as the friction wheels are shifted towards the centre of rotation the speed of the shaft 25 decreases until it remains stationary; further movement serves to reverse the direction of rotation of the shaft; the speed varying proportionately to the extent of movement.

To throw the device into neutral, the collar 24 is slid along the shaft 14. This moves the housing 18 towards this shaft as previously recounted. This movement disengages the teeth of the disc from those of the casing 10 and frees the friction wheels from the disc so that no power is imparted to the driven shaft 25. A continuation of this movement however engages the anti-friction bearings 34 with the face 34' of the flange 34" and forces the teeth of the housing 18 into engagement with those of the disc, thus locking the friction wheels against turning on their axis. This provides direct speed. Whenever the friction wheels are disposed beyond low speed position they are automatically returned upon release of the collar 62' by the counterweights 51.

What I claim is:—

1. A transmission consisting of friction wheels, radial shafts slidably supporting the wheels, keys securing the wheels against independent rotation, a journalled housing rotatably supporting said radial shafts, a driven shaft axially journalled in the housing, bevel gearing connecting said radial shafts to the driven shaft, a friction disc for contact with said friction wheels and floatingly disposed within said housing, said disc having a toothed face for frictional engagement with teeth provided on said housing, a fixed case surrounding the housing and having teeth for engagement with those of the disc, bearings mounted upon the outer ends of the aforesaid radial shafts, means for shifting the friction wheels on their shafts, a driving shaft, means connecting the driving shaft to the housing in such a manner that the housing can be axially shifted, and means providing an annular face for engagement with said bearings when the housing is shifted in one direction.

2. A transmission consisting of friction wheels, radial shafts slidably supporting the wheels, keys securing the wheels against independent rotation, a journalled housing rotatably supporting said radial shafts, a driven shaft axially journalled in the housing, bevel gearing connecting said radial shafts to the driven shaft, a friction disc for contact with said friction wheels and floatingly disposed within said housing, said disc having a toothed face for frictional engagement with teeth provided on said housing, a fixed case surrounding the housing and having teeth for engagement with those of the disc, bearings mounted upon the outer ends of the aforesaid radial shafts, rods journalled within the housing and extending parallel to the radial shafts, shifters borne thereby, pins fixed in said shifters and engaged in helical channels provided in the rods, collars integral with said friction wheels and connected to said shifter, a cone shifting mechanism for controlling said rods, a driving shaft, means connecting the driving shaft to the housing in such a manner that the housing can be axially shifted, and means providing an annular face for engagement with said bearings when the housing is shifted in one direction.

3. A transmission consisting of friction wheels, radial shafts slidably supporting the wheels, keys securing the wheels against independent rotation, a journalled housing rotatably supporting said radial shafts, a driven shaft axially journalled in the housing, bevel gearing connecting said radial shafts to the driven shaft, a friction disc for contact with said friction wheels and floatingly disposed within said housing, said disc having a toothed face for frictional engagement wth teeth provided on said housing, a fixed case surrounding the housing and having teeth for engagement with those of the disc, bearings mounted upon the outer ends of the aforesaid radial shafts, rods journalled within the housing and extending parallel to the radial shafts, said rods being journalled for swivelling as well as rotary movement, shifters so mounted upon the rods as to be axially moved by their rotary motion, said shifters being adapted to shift the friction wheels, a manual control mechanism for said rods, a driving shaft, means connecting the driving shaft to the housing in such a manner that the housing can be axially shifted, and means providing an annular face for engagement with said bearings when the housing is shifted in one direction.

4. A transmission consisting of friction wheels, radial shafts slidably supporting the wheels, keys securing the wheels against independent rotation, a journalled housing rotatably supporting said radial shafts, a driven shaft axially journalled in the housing, bevel gearing connecting said radial shafts to the driven shaft, a friction disc for contact with said friction wheels and floatingly disposed within said housing, said disc having a toothed face for frictional engagement with teeth provided on said housing, a fixed case surrounding the housing and having teeth for engagement with those of the disc, bearings mounted upon the outer ends of the aforesaid radial shafts, means for shifting the friction wheels on their shafts, a driving shaft having an enlarged end, a boss integral with the housing and fitted in a recess in said enlarged end, pins projecting from the boss and lodged in helical slots provided in the enlarged end, shifters pivoted on said end and engaged with said pins, means for controlling said shifters, and means providing an annular face for engagement with said bearings when the housing is shifted in one direction.

Signed at Toronto, Ontario, Canada, this 26th day of April, 1930.

CORNELIS FRANCISCUS VAN der SPEK.